(12) United States Patent
Runacre et al.

(10) Patent No.: US 7,202,285 B2
(45) Date of Patent: *Apr. 10, 2007

(54) RADIATION-CURABLE COMPOSITION

(75) Inventors: Angelique Runacre, Kent (GB); Paul Geoffrey Day, Kent (GB)

(73) Assignee: Sericol Limited, Broadstairs, Kent (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/240,309

(22) PCT Filed: Mar. 27, 2001

(86) PCT No.: PCT/GB01/01356

§ 371 (c)(1),
(2), (4) Date: May 20, 2003

(87) PCT Pub. No.: WO01/74952

PCT Pub. Date: Oct. 11, 2001

(65) Prior Publication Data

US 2005/0020745 A1  Jan. 27, 2005

(30) Foreign Application Priority Data

Mar. 30, 2000 (GB) ................................ 0007627.3

(51) Int. Cl.
*C08F 2/46* (2006.01)
*C08F 2/50* (2006.01)
*C08J 3/20* (2006.01)

(52) U.S. Cl. ............................ 522/81; 522/71; 522/77; 522/82; 522/83; 522/96; 522/90; 522/100; 522/104; 522/178; 522/181; 522/182; 522/173; 522/113; 522/114; 524/394; 524/556

(58) Field of Classification Search .................. 522/71, 522/77, 81, 82, 83, 96, 90, 100, 104, 178, 522/181, 182, 173, 113, 114; 524/394, 556
See application file for complete search history.

(56) References Cited

U.S. PATENT DOCUMENTS 5,256,446 A * 10/1993 Bogen ...................... 427/163.4
5,364,726 A    11/1994 Morrison et al.
5,703,138 A *  12/1997 Cantor et al. ................. 522/29
6,815,468 B2 * 11/2004 Nixon et al. ................... 522/75

FOREIGN PATENT DOCUMENTS

EP   0 909 991    4/1999
JP   64-90266     4/1989

* cited by examiner

*Primary Examiner*—Sanza L. McClendon
(74) *Attorney, Agent, or Firm*—Reed Smith LLP

(57) ABSTRACT

Compositions suitable for use as base coats and varnishes, preferably for use in combination with electrostatic of set inks printed onto plastics substrates, particularly polycarbonate compact discs. They contain a photopolymerisable material, a photoinitiator, an inorganic transfer agent and heavy metal salt, preferably a metallic carboxylate. They have a good shelf life and good adhesion after hardening with ultraviolet light.

22 Claims, No Drawings

RADIATION-CURABLE COMPOSITION

CROSS-REFERENCES TO RELATED APPLICATIONS

This application claims priority of Great Britain Application No. PCT/GB01/01356 filed Mar. 27, 2001 which claims the priority of Great Britain Application No. 0007627.3 filed Mar. 30, 2000, the complete disclosure of which is hereby incorporated by reference.

This invention concerns a radiation-curable composition. In particular, this invention concerns a radiation-curable composition that can be used as a varnish or base coat such as, for example, as a coated layer possessing good adhesion to electrostatic offset inks.

In electrostatic offset printing an image is formed by directing one or more pigmented inks or toners on to a selectively charged drum, which are then transferred, either directly or via an intermediate member, on to a substrate. Electrostatic offset printers are made and sold, for example, by Indigo NV and by Xeikon SA.

Inks used in offset printing have difficulty adhering to certain substrates such as plastics. This can be overcome by modifying the surface of the substrate. The surface can be modified by the application of a preliminary base coat comprising, for example, a solvent-based resin such as, for example, a polyamide, a butadiene resin or an ethylene-acrylic acid resin (see JP 10076744). When a solvent-based resin is used, the solvent needs to be evaporated before printing, which can be slow, hazardous and offensive, and is environmentally unfriendly.

WO 98/49604 discloses a copolymer receptor layer which is applied by extrusion to a polyvinyl chloride backing to improve the abrasion resistance of a printed image. The copolymer receptor layer can also be used to improve print quality on a polycarbonate backing layer. In both of these applications, we are told that the copolymer receptor layer adheres to the polyvinyl chloride backing layer in the absence of UV radiation.

One aim of the present invention is to provide a composition for a base coat that can be used on difficult substrates, such as plastic substrates, that are printed using, for example, electrostatic offset printing. A further aim of the present invention is for the viscosity of the composition to remain stable on storage. A further aim of the present invention is for the composition not to be capable of detrimentally attacking the surface of a compact disc. A further aim of the present invention is for the composition to exhibit a good bond with electrostatic offset inks. A further aim of the present invention is to provide a base coat that can be applied by screen process printing or by any other suitable coating or printing process.

In accordance with the present invention there is provided a composition for use as a base coat or varnish, the composition comprising:
(i) one or more ethylenically unsaturated monomers, oligomers or prepolymers that are capable of being photopolymerized;
(ii) a photoinitiator that is capable of initiating the polymerization of the ethylenically unsaturated monomers (i) when irradiated with ultra-violet light;
(iii) an inorganic transfer agent; and
(iv) a heavy metal salt.

In accordance with the present invention there is also provided a method for printing a substrate, the method comprising the step of applying a base coat to the substrate before printing, the base coat comprising the composition defined above.

There is also provided a method for varnishing a printed substrate, the method comprising the step of applying a varnish to a printed substrate, the varnish comprising the composition defined above.

In accordance with the present invention there is also provided use of the composition defined above as a base coat or varnish for printing.

The composition of the present invention does not contain a volatile solvent which must be evaporated in use, it has a good shelf life, and it does not contain aggressive amine compounds. The composition may be applied to, for example, a polycarbonate compact disc by various printing or coating methods, and, after hardening by ultra-violet irradiation, it gives a tough layer to which electrostatic offset ink adheres well. Another application for the composition is as a varnish applied over a previously printed layer of electrostatic offset ink, in which case the varnish adheres well to the previously printed ink and possesses good clarity and resistance to abrasion.

The base coat or varnish may be applied to a substrate using, for example, screen process printing, flexography, curtain coating or roller coating.

In use, the base coat or varnish is applied to a substrate and then irradiated using ultra-violet light, typically of wavelength between 250 and 450 nanometres. Preferred substrates are plastics articles, such as labels, packaging films, graphic overlay film, membrane switch panels, and especially uncoated and spin-coated polycarbonate compact discs or DVD's.

The ethylenically unsaturated monomer, oligomer or prepolymer (i) is preferably an ester of acrylic or methacrylic acid, such as, for example, octyl acrylate, decyl acrylate, lauryl acrylate, phenoxyethyl acrylate, hexanediol diacrylate, tri(propylene glycol) triacrylate, trimethylolpropane triacrylate, tetrahydrofurfuryl acrylate, polyethylene glycol diacrylate, hydroxyethyl methacrylate; or an N-vinylamide such as, for example, N-vinylcaprolactam or N-vinylformamide. Other useful monomers are acryloylmorpholine, the acrylate esters of the ethoxylated or propoxylated derivatives of di-, tri- or tetrahydric aliphatic alcohols, and the acrylate or methacrylate esters of epoxy-, urethane, melamine or polyester resins or their ethoxylated or propoxylated derivatives. Mixtures of monomers may be used. The monomer is preferably present in an amount from 10 to 80%, more preferably 23 to 50%, by weight of the composition.

The photoinitiator (ii) is either of the type known to produce free radicals when irradiated with ultra-violet light, or of the "cationic" type which yields a strong protonic acid when irradiated. Photoinitiators of the former type are, for example, benzophenone, 1-hydroxycyclohexyl phenyl ketone, isopropylthioxanthone, 2-hydroxy-2-methyl-1-phenylpropan-1-one, 2-benzyl-2-dimethylamino-(4-morpholinophenyl)butan-1-one, benzil dimethylketal, bis(2,6-dimethylbenzoyl)-2,4,4-trimethylpentylphosphine oxide, 2,4,6-trimethylbenzoyldiphenylphosphine oxide, or a mixture thereof. Photoinitiators of this class are commercially available, for example, under the trade names Irgacure (from Ciba), Genocure (from Rahn AG), Darocure (from Ciba), Lucerin (from BASF). Photoinitiators of the cationic type are, for example, sulphonium or iodonium salts such as triphenylsulphonium hexafluoroantimonate or diphenyliodonium hexafluorophosphate. Colourless or nearly colourless materials are preferred. Yellow coloured photoinitiators may also be preferred. The photoinitiator is preferably present in a total amount from 0.5 to 20%, more preferably from 2.5 to 8%, by weight of the composition.

The inorganic transfer agent (iii) is preferably a silica or a modified silica or mixtures thereof. Suitable silicas are Aerosil 200 (available from Degussa) and Cab-o-sil TS610 (available from Cabot). We have found that a suitable inorganic transfer agent has the combined advantages of giving a desirable "structure" to the compositions, i.e. resistance to flow under gravity without excessive viscosity at higher shear, and rendering the final cured base coat particularly receptive to electrostatic offset ink. The inorganic transfer agent (iii) is preferably present in an amount from 0.5 to 50%, more preferably from 2 to 45%, by weight of the composition.

The heavy metal salt (iv) is preferably a metallic carboxylate, although a naphthenate, acetate or carbonate or any anion imparting solubility is also effective. The metallic carboxylate is preferably the salt of an aliphatic or alicyclic carboxylic acid having between 6 and 20 carbon atoms. The heavy metal cation is preferably cobalt, zirconium, manganese, cerium, strontium or barium. Examples of heavy metal carboxylates are cobalt 2-ethylhexanoate, zirconium iso-octanoate and manganese neodecanoate. Such compounds are known as paint driers, and are frequently available commercially under trade names, such as "Durham" from Elementis Specialties and "Manosec" from Rhone Poulenc. The use of heavy metal salts, for example, zirconium salts such as zirconium acetate or ammonium zirconium carbonate, to improve the toughness of polymer layers, is known in the art, for example, in screen stencils (see EP 0 909 991), but the use of heavy metal driers as assistants for the adhesion of electrostatic offset ink to a basecoat containing them is novel and unexpected. As is known in the art, such metal salts may be classified by the proportion by weight of the heavy metal salt (iv) in order to give a calculated proportion of heavy metal in the total composition between 0.1 and 6%, preferably between 0.8 and 4% by weight.

Optionally, other additives of known types may also be present such as, for example, passive resins (i.e. resins that are not cured by ultra-violet light) to stabilise the viscosity of the composition and improve the adhesion or other physical properties of the cured layer; dyes or pigments, especially white pigment to form an opaque background for the electrostatic offset print; stabilisers to prevent deterioration of the composition to heat or on storage; flow and slip aids; biocides; identifying tracers, defoamers; and surfactants.

The components of the compositions are selected so that they are compatible with each other and provide a mixture stable on storage, with the required rheological and other properties. In particular, the compositions are preferably formulated to give a Theological profile suitable for application printing, especially by screen-printing. For this purpose their gel strength, as measured as the viscosity at 25° C. on a Brookfield RVDT digital viscometer at 5 r.p.m using a No. 6 spindle, lies between 40 and 1000 but preferably lies between 100 and 500 poise, and their viscosity under higher shear, as measured on the Rotothinner (supplied by Sheen Instruments), lies between 5 and 65 poise but preferably lies between 20 and 50 poise.

The substrate may be foil, paper or board, or a plastics material such as, for example, polycarbonate, or poly(vinyl chloride). Preferred is polycarbonate such as is used in the production of compact discs. The substrate may be printed with the composition using a screen stencil or by any other appropriate printing or coating method, and then hardened by exposure to ultra-violet light. The light may be directed directly on to the printed substrate or via a 'cold' mirror system or similar cold cure lamp system, using commercially available equipment, for example, from Svecia or Kammann. A typical exposure is up to 100 impressions per minute with two mercury lamps having 240 watts/centimeter power on a Kamman K15 printer. After curing, the substrate bearing the base coat is especially suitable for receiving electrostatic offset ink.

In an alternative embodiment of the invention, the substrate bears a previously printed image, preferably an image produced using an electrostatic offset ink. The composition is then applied to the substrate as a varnish using a screen stencil or other appropriate printing or coating method and hardened as above. The result is a tough resistant layer covering the image and having good adhesion to it.

The invention will now be described with reference to the following Examples, in which all parts are by weight:

EXAMPLE 1

The following components were mixed at ambient temperature in a stainless steel pot using a Torrance stirrer until homogeneous:

| | |
|---|---|
| Tri(propyleneglycol) diacrylate | 38.7 parts |
| Fluorstab UV-5 (stabiliser from Kromachem Ltd) | 1 part |
| Adhesion resin LTH (from Huels AG) | 22.8 parts |
| Ebecryl 160 (acrylate monomer from UCB SA) | 13.0 parts |

The following components were added successively, each time with stirring until dissolved:

| | |
|---|---|
| Durham Zirconium 18 (zirconium carboxylate from Harcros) | 16.5 parts |
| Irgacure 184 (photoinitiator from Ciba) | 4 parts |

The following component was added and the stirring was continued until no nibs were detected on a Hegman gauge. During this stage the temperature of the mixture was allowed to rise to 40 C.

| | |
|---|---|
| Aerosil 200 (silica from Degussa AG) | 4 parts |

The product was finally filtered through muslin. Its viscosity at 25° C. was 500 poise measured on a Brookfield RVDT digital viscometer at 5 r.p.m using a No. 6 spindle and 41 poise measured on a Rotothinner. The composition was useful as a clear primer for printing on a polycarbonate compact disc.

EXAMPLE 2

The following components were mixed as described in Example 1:

| | |
|---|---|
| Tripropylene diacrylate | 35.8 parts |
| Ebecryl 160 | 13.0 parts |
| Adhesion Resin LTH | 23.2 parts |
| Irgacure 184 | 4.0 parts |

| | |
|---|---|
| Co12 Hex-Cem (cobalt carboxylate from OMG Kokkola Chemicals OY) | 20.0 parts |
| Aerosil 200 | 4.0 parts |

The viscosity of the product was 100 poise on the Brookfield viscometer and 35 poise on the Rotothinner, in each case measure as in Example 1.

EXAMPLE 3

The following components were mixed as described in Example 1 and stirred off-gauge:

| | |
|---|---|
| Highlink OG 103-53 | 75.7 parts |
| Fluorstab UV-5 | 0.5 parts |
| Durham Zirconium 18 | 16.5 parts |
| Irgacure 184 | 3.3 parts |
| Aerosil 200 | 4.0 parts |

(Note: Highlink OG 103-53 from Clariant is a commercial mixture of an acrylate ester and a modified silica. Therefore, it contains both components (i) and (iii).)

The viscosity of the product was 10 poise on the Brookfield viscometer and 6 poise on the Rotothinner, in each case measured as in Example 1.

EXAMPLE 4

The following components were mixed as described in Example 1 and stirred off-gauge:

| | |
|---|---|
| Tripropyleneglycol diacrylate | 14.7 parts |
| Fluorstab UV-5 | 1 part |
| Adhesion resin LTH | 12.3 parts |
| Ebecryl 160 | 12.5 parts |
| N-vinylcaprolactam | 10 parts |
| Durham Zirconium 18 | 16.5 parts |
| Irgacure 184 | 4 parts |
| Lucerin TPO (photoinitiator from BASF) | 4 parts |

When all these components had dissolved, the following components were added and successively stirred until no nibs were visible on a Hegman gauge:

| | |
|---|---|
| Finntitan RDDI (white pigment from Kemira OY) | 22 parts |
| Aerosil 200 | 3 parts |

The viscosity of the product, measured as above, was 310 poise on a Brookfield viscometer and 30 poise on a Rotothinner. When printed as a primer on a polycarbonate substrate and exposed to ultra-violet light, it formed an opaque white base-coat which was suitable to receive a coloured image printed by the electrostatic offset process.

EXAMPLE 5

The following were mixed as described in Example 1:

| | |
|---|---|
| Tris(hydroxymethyl)propane triacrylate | 13.5 parts |
| Tri(propyleneglycol) triacrylate | 19.6 parts |
| Fluorstab UV-5 | 1 part |
| Adhesion resin LTH | 3.9 parts |
| Actilane 320TP20 (epoxy acrylate from Akcros) | 45 parts |
| Durham Zirconium 18 | 5 parts |
| Irgacure 184 | 4 parts |
| Benzophenone | 2.5 parts |
| Aerosil 200 | 4 parts |

The mixture was stirred until no nibs were visible on the Hegman gauge, then the following components were added and stirred for 30 minutes:

| | |
|---|---|
| Modaflow (flow aid from Monsanto) | 1 part |
| Tegoglide 410 (slip aid from Th. Goldschmidt) | 0.5 part |

The viscosity of the product, measured as above, was 500 poise on a Brookfield viscometer and 42 poise on a Rotothinner. The product was applied as a varnish over an image printed on a polycarbonate substrate by an electrostatic offset printer and, when exposed to ultra-violet light, gave a clear resistant layer.

EXAMPLE 6

The following components were weighed into a pot and stirred until homogenous. The temperature was not allowed to reach 40° C.

| | |
|---|---|
| Highlink OG 103-53 | 44.5 |
| Genorad 16 (Lambson/Rahn) | 0.6 |
| Ebecryl 220 (UBC) | 12.6 |
| Glycerine (Monarch) | 0.2 |

The following photoinitiators were added and stirring continued for 10 minutes until a homogenous mixture produced:

| | |
|---|---|
| Darocure 1173 (Ciba) | 2.0 |
| Irgacure 184 | 2.4 |
| Lucirin TPO | 2.8 |

The following were added while stirring until no nibs were visible on a Hegman Gauge:

| | |
|---|---|
| Finntitan RDDI (white pigment) | 16.8 |
| Aerosil 200 | 4.3 |

The product produced was a white ink having a viscosity at 25° C. of 23 poise when measured on the Rotothinner, and 140 poise on the Brookfield RV6/5.

The invention claimed is:

1. A composition for use as a base coat or varnish, having a viscosity of 25° C. on a Brookfield RVDT digital viscometer at 5 r.p.m. using a No. 6 spindle of between 40 and 1000 poise, and a viscosity under higher shear, as measured on the Rotothinner (supplied by Sheen Instruments) between 6 and 65 poise, the composition comprising:
  (i) from 10 to 80% by weight of the composition of one or more ethylenically unsaturated monomers, oligomers or prepolymers that are capable of being photopolymerized;
  (ii) from 0.5 to 20% by weight of the composition of a photoinitiator that is capable of initiating the polymerization of the ethylenically unsaturated monomers (i) when irradiated with ultra-violet light;
  (iii) from 0.5 to 50% by weight of the composition of an inorganic transfer agent; and
  (iv) between 0.1 and 6% by weight of the composition of a heavy metal salt.

2. The composition claimed in claim 1, wherein the monomer, oligomer or prepolymer is an ester of acrylic or methacrylic acid, or a N-vinylamide, or a mixture thereof.

3. The composition claimed in claim 2, wherein the ester is phenoxyethyl acrylate, hexanediol diacrylate, tri(propylene glycol) diacrylate, trimethylolpropane triacrylate, polyethylene glycol diacrylate, hydroxyethyl methacrylate, trimethylolpropane triacrylate, tetrahydrofurfuryl acrylate, lauryl acrylate, octyl acrylate, decyl acrylate, acrylates of polyurethane, polyester, polyether, melamine or epoxy resins, ethoxylated or propoxylated derivatives of any of the aforementioned acrylates or methacrylates or a mixture thereof.

4. The composition claimed in claim 2, wherein the N-vinylamide is N-vinylcaprolactam or N-vinylformamide.

5. The composition claimed in claim 1 wherein the monomer, oligomer or prepolymer (i) is present in an amount from 23 to 50, by weight of the composition.

6. The composition claimed in claim 1, wherein the photoinitiator (ii) is selected from benzophonone, 1-hydroxycyclohexyl phenyl ketone, isopropylthioxanthone, 2-hydroxy-2 methyl-1-phenylpropan-1-one, 2-benzyl-2-dimethylamino-(4-morpholinophenyl)butan-1-one, benzil dimethylketal, bis(2,6-dimethlybenzoyl)-2,4,4-trimethylpentylphosphine oxide, 2,4,6-trimethylbenzoyldiphenylphosphine oxide, sulphonium or iodonium salts such as triphenylsulphonium hexafluoroantimonate or diphenyuliodonium hexafluorophosphate; or a mixture thereof.

7. The composition claimed in claim 1, wherein the photoinitiator (ii) is colourless or nearly colourless.

8. The composition claimed in claim 1, wherein the photoinitiator is presenting a total amount from 2.5 to 8%, by weight of the composition.

9. The composition claimed in claim 1, wherein the inorganic transfer agent (iii) is a silica or a modified silica or mixtures thereof.

10. The composition claimed in claim 1, wherein the inorganic transfer agent (iii) is presenting an amount from 2 to 35%, by weight of the composition.

11. The composition claimed in claim 1, wherein the heavy metal salt (iv) is a metallic carboxylate, naphthenate, acetate or carbonate.

12. The composition claimed in claim 11, wherein the metallic carboxylate is an aliphatic or alicyclic carboxylic acid having between 6 and 20 carbon atoms.

13. The composition claimed in claim 11, wherein the heavy metal salt includes a cation selected from cobalt, zirconium, manganese, cerium, strontium or barium.

14. The composition as claimed in claim 1, wherein the proportion of the heavy metal in the heavy metal salt (iv) is between 0.8 and 4% by weight of the composition.

15. The composition as claimed in claim 1, wherein the composition has a viscosity at 25° C. on a Brookfield RVDT digital viscometer at 5 r.p.m using a No. 6 spindle of between 100 and 500 poise; and a viscosity under higher shear, as measured on the Rotothinner (supplied by Sheen Instruments), between 30 and 50 poise.

16. The composition as claimed in claim 1, wherein the composition includes a pigment, preferably a white pigment.

17. The composition claimed in claim 1, wherein the composition is used in screen process printing, flexography, curtain coating or roller coating.

18. A method for printing a substrate, the method comprising the step of applying a base coat to the substrate before printing, the base coat comprising the composition claimed in claim 1.

19. The method claimed in claim 18, wherein the substrate is foil, paper or board, or a plastics material.

20. The method claimed in claim 19, wherein the plastics material is selected from polycarbonate, or poly(vinyl chloride).

21. A method for varnishing a printed substrate, the method comprising he step of applying a varnish to a printed substrate, characterized in that the varnish comprises the composition claimed in claim 1.

22. A substrate having a base coat or varnish thereon, the base coat or varnish comprising the composition of claim 1.

* * * * *